United States Patent
Tu et al.

(10) Patent No.: US 9,550,481 B2
(45) Date of Patent: Jan. 24, 2017

(54) TRAILER WITH A TRAILER BRAKE CONTROL DEVICE THEREIN

(71) Applicant: TUSON (JIAXING) CORPORATION, Jiaxing (CN)

(72) Inventors: Roger H. Tu, Vernon Hills, IL (US); Wei Chih Chen, Taichung (TW)

(73) Assignee: TUSON (JIAXING) CORPORATION, Jiaxing (CN)

( * ) Notice: Subject to any disclaimer, the term of this patent is extended or adjusted under 35 U.S.C. 154(b) by 88 days.

(21) Appl. No.: 14/538,285

(22) Filed: Nov. 11, 2014

(65) Prior Publication Data

US 2016/0129896 A1    May 12, 2016

(51) Int. Cl.
*B60T 8/24*    (2006.01)
*B60T 8/171*   (2006.01)
*B60T 8/17*    (2006.01)
*B60T 7/20*    (2006.01)

(52) U.S. Cl.
CPC .................. *B60T 8/248* (2013.01); *B60T 7/20* (2013.01); *B60T 8/1708* (2013.01); *B60T 2230/06* (2013.01); *B60T 2270/413* (2013.01)

(58) Field of Classification Search
CPC ............................ B60T 8/1708; B60T 2230/06
See application file for complete search history.

(56) References Cited

U.S. PATENT DOCUMENTS

| 6,042,196 A | 3/2000 | Nakamura et al. |
| 7,741,960 B1 | 6/2010 | Hoogenakker et al. |
| 8,180,546 B2 | 5/2012 | Culbert et al. |
| 9,026,311 B1 * | 5/2015 | Pieronek ............... B60W 10/18 280/455.1 |
| 2012/0041659 A1 * | 2/2012 | Greene .................... B60D 1/30 701/70 |
| 2013/0124059 A1 | 5/2013 | Funder et al. |

* cited by examiner

*Primary Examiner* — Todd Melton
(74) *Attorney, Agent, or Firm* — Huffman Law Group, PC (57) ABSTRACT

The present invention relates to a trailer with a trailer brake control device therein. The trailer brake control device of the present invention comprises: a sway detecting sensor arranged in the trailer for detecting the sway of the trailer; a signal sensor for detecting a brake signal generated by a brake switch of a vehicle which tows the trailer; and a processor, electrically connected to the sway detecting sensor, the signal sensor and the brake, for controlling the brake based on an output of the sway detecting sensor and/or an output of the signal sensor. According to the present invention, the trailer brake control device can independently control the brakes and/or diagnose the malfunction of a brake controller arranged in the vehicle.

11 Claims, 7 Drawing Sheets

TRAILER WITH A TRAILER BRAKE CONTROL DEVICE THEREIN

FIELD OF THE INVENTION

The present invention relates generally to a trailer which is towed by a towing vehicle and, more particularly, to a trailer brake control device for controlling a brake which provides force on at least one wheel of the trailer.

BACKGROUND OF THE INVENTION

Towed vehicles, such as trailers that are towed by towing vehicles (trucks or pickups) are commonly provided with electric wheel brakes. Typically, the braking force produced by the brakes is proportional to the electric current applied to the brakes. Electrically actuated brakes can be driven against the ground potential of the vehicle's power supply, which can be, for example, a battery. Thus, one end of each of the towed trailer's brakes is electrically connected to the trailer ground and the trailer ground is electrically connected to the towing vehicle ground. The other end of each of the trailer's brakes is electrically connected through a brake controller to the towing vehicle's power supply.

Figure 1:
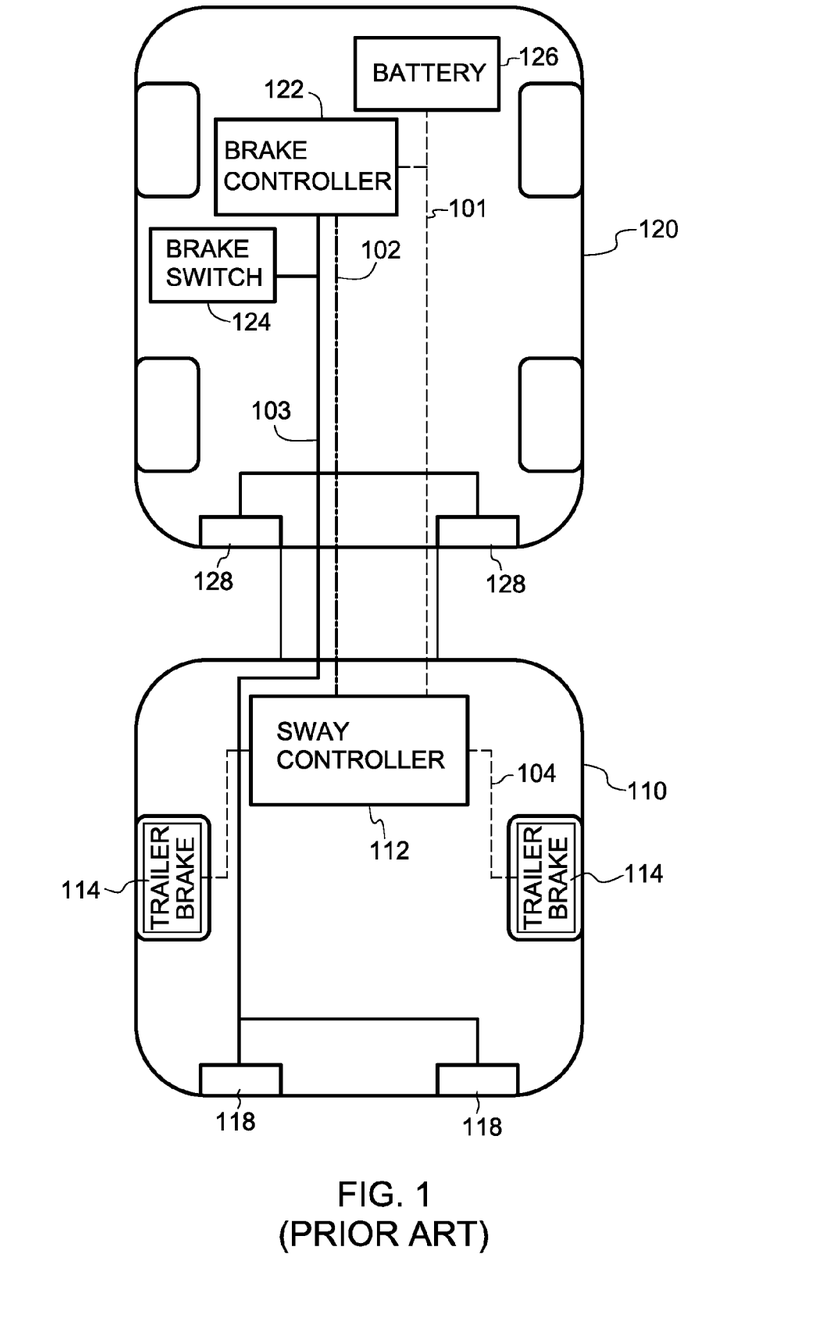
FIG. 1 is a diagram illustrating a towing vehicle towing a conventional trailer in accordance with prior art.

FIG. 1 is a diagram illustrating the structure of a conventional trailer 110 towed by a towing vehicle 120 such as a pickup or a truck. As shown in FIG. 1, the trailer 110 comprises a conventional sway controller 112, trailer brakes 114, and brake lights 118. The towing vehicle 120 comprises a brake controller 122, a brake switch 124, a battery 126, and brake lights 128. The brake controller 122 is electrically connected to the sway controller 112 through a wire 102. The brake switch 124 may be a brake pedal or a manual switch which is electrically connected to the brake controller 122 and the brake lights 118 and 128 through another wire 103. The battery 126 is electrically connected to the brake controller 122 and the sway controller 112 through a power wire 101 so as to provide power to the brake controller 122 and the sway controller 112 as well as the devices connected thereto. The sway controller 112 is also electrically connected to the trailer brakes 114 through the power wires 104.

When a driver in the towing vehicle triggers a brake action such as stepping on a brake pedal (not shown) or pressing a brake button (not shown), the brake switch is turned on and sends a brake signal to the brake controller 122 and the brake lights 118 and 128. According to FIG. 1, the brake controller 122 is located in the towing vehicle 120 for sending a desired controlling signal to the sway controller 112 through wire 102 responsive to the brake signal sent from the brake switch 124 through wire 103, so as to control the trailer brakes 114. Various brake controllers for controlling trailer brakes are known in the art.

As known to persons with ordinary skill in the art, a sway controller can be disposed either in a towing vehicle or in a trailer. However, a sway controller being disposed in a towing vehicle would have the following drawbacks. Firstly, since a sway detecting sensor is usually located in the sway controller, if the sway controller is disposed in the towing vehicle, the sway detecting sensor can only detect the sway of the towing vehicle, which is itself caused by the sway of the trailer connected to the towing vehicle and is relatively less noticeable than the sway of the actual trailer. Thus, the sensitivity of the sway detecting sensor and the ability of the sway detecting sensor to accurately determine the sway of the trailer would not be ideal. Consequently, the ability of the sway controller to control the sway of the trailer, which depends on the sensed sway, would not be ideal either.

Secondly, there are already a number of trailer providers in the market that provide trailers with sway controllers incorporated therein, and the sway controllers in such trailers can usually be connected to the brake controller of a towing vehicle through an existing standard connector. In such a case, if the towing vehicle is also equipped with a sway controller, the towing vehicle would not be suitable for a connection with a trailer with a sway controller incorporated therein because (1) such a towing vehicle may be incompatible with the existing standard connector, (2) one of the two sway controllers may be redundant, or (3) the two sway controllers may be incompatible with each other.

FIG. 1 shows an example in which the conventional sway controller 112 is located in the trailer 110. The conventional sway controller 112 may include a gyro sensor or a gyroscope (not shown) and is configured to detect the sway of the trailer 110 via the gyro sensor and to stop or reduce the sway through engaging the trailer brakes 114. According to the operation of the conventional sway controller 112, when the driver triggers a braking action, the sway controller 112 must be instructed by the brake controller 122 and cannot work independently.

However, the conventional sway controller has several drawbacks. First of all, the conventional sway controller can only be instructed by the brake controller so as to control the trailer brakes, but cannot control the trailer brakes independently. Therefore, a towing vehicle towing the conventional trailer with the conventional sway controller must be equipped with a brake controller for controlling the trailer brakes. Furthermore, since the conventional sway controller must be instructed by the brake controller through wire 102, if the brake controller and/or wire 102 malfunction, the sway controller cannot engage the trailer brakes so as to slow down or stop the trailer, which may cause dangerous accidents.

In order to address the above-mentioned drawbacks, there is a need for an improved trailer brake control device, which can work independently or can detect whether the brake controller is functioning properly.

SUMMARY OF THE INVENTION

In one aspect, a trailer brake control device arranged in a trailer is provided. The trailer brake control device can be used for controlling a brake which provides force on at least one wheel of the trailer. The trailer brake control device comprises: a sway detecting sensor arranged in the trailer for detecting the sway of the trailer; a signal sensor for detecting a brake signal generated by a brake switch of a vehicle which tows the trailer; and a processor, electrically connected to the sway detecting sensor, the signal sensor and the brake, for controlling the brake based on an output of the sway detecting sensor and/or an output of the signal sensor.

In another aspect, the signal sensor further detects a control signal generated by a brake controller in the vehicle, and the processor compares the brake signal and the control signal and determines whether the brake controller functions or malfunctions based on whether the brake signal and the control signal are compatible or incompatible.

In another aspect, the trailer brake control device further comprises a multi-function switch having a first input electrically connected to the processor via a pulse width modulator, a second input electrically connected to the brake controller in the vehicle, an output electrically connected to the brake, and a control terminal electrically connected to the processor for selectively connecting the first input to the output by setting the multi-function switch to a first state and for selectively connecting the second input to the output by setting the multi-function switch to a second state.

In another aspect, the processor sets the multi-function switch to the first state via the control terminal if the brake signal and the control signal are incompatible, and the processor sets the multi-function switch to the second state via the control terminal if the brake signal and the control signal are compatible.

These and other features, aspects, and embodiments are described below in the section entitled "Detailed Description of the Invention."

BRIEF DESCRIPTION OF THE DRAWING

Features, aspects, and embodiments are described in conjunction with the attached drawings, in which.

DETAILED DESCRIPTION OF THE INVENTION

The present invention will now be more fully described hereinafter with reference to the accompanying drawings, in which embodiments of the present invention are shown. The present invention may, however, be embodied in many different forms and should not be construed as being limited to the embodiments set forth herein. Rather, these embodiments are provided so that this disclosure will be thorough and complete, and will fully convey the scope of the present invention to those skilled in the art. In the drawings, the lengths of the lines and the sizes of the blocks and/or areas may not be proportional to the actual lengths and sizes.

Embodiments of the present invention are described herein with reference to the illustrative diagrams that are schematic illustrations of the embodiments of the present invention. As such, variations from the shapes of the illustrations as a result, for example, of manufacturing techniques and/or tolerances, are to be expected. Thus, embodiments of the present invention should not be construed as limited to the particular shapes illustrated herein but are to include deviations in shapes that result, for example, from manufacturing.

Hereinafter, the present invention will be explained in detail with reference to the accompanying drawings.

Figure 2:
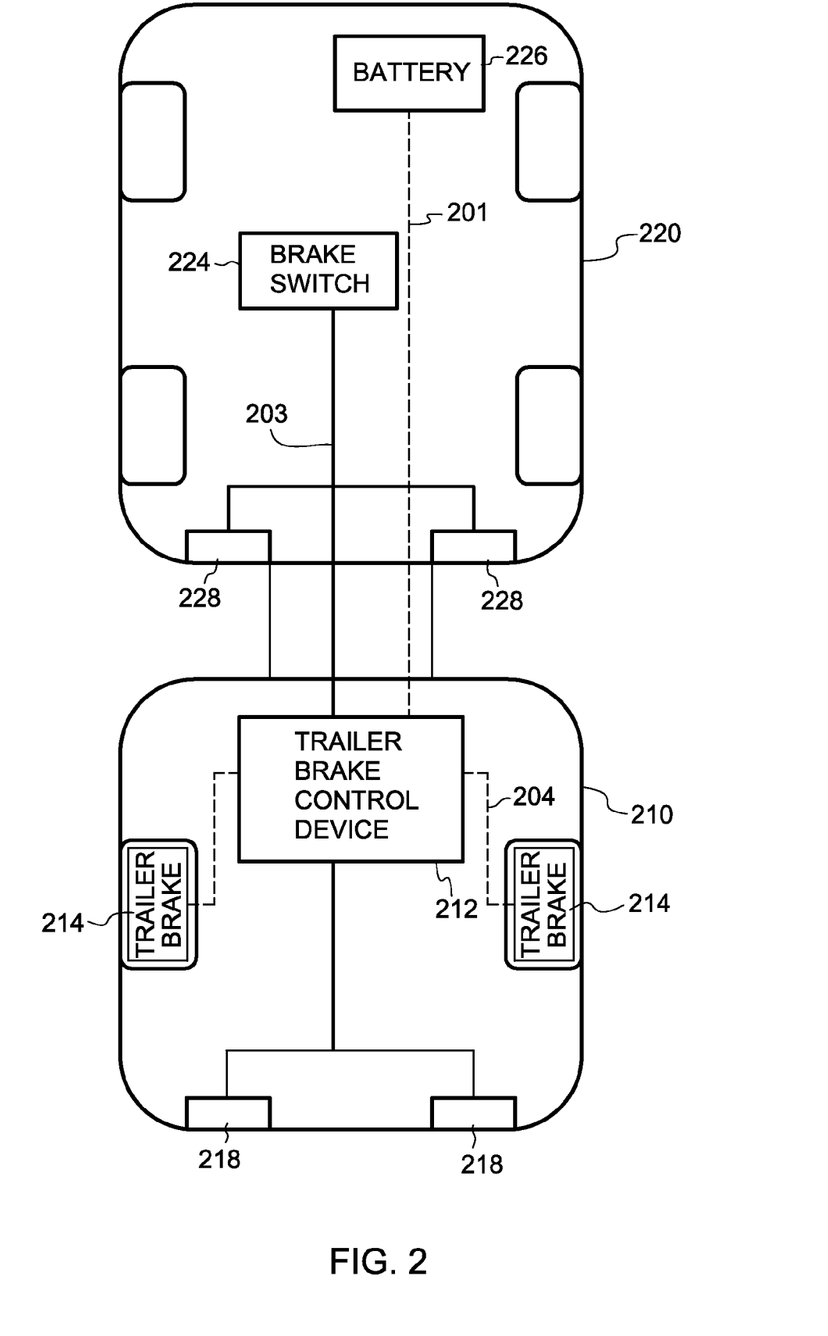
FIG. 2 is a simplified diagram illustrating a towing vehicle towing a trailer in accordance with one preferred embodiment of the present invention.

FIG. 2 is a simplified diagram illustrating a trailer towed by a towing vehicle in accordance with one preferred embodiment of the present invention. As shown in FIG. 2, the trailer 210 is towed by a towing vehicle 220. The trailer 220 comprises a trailer brake control device 212, brakes 214, and brake lights 218. The towing vehicle 220 comprises a brake switch 224, a battery 226, and brake lights 228. The trailer brake control device 212 is electrically connected to the battery 226 through a power wire 201 so as to be powered. The trailer brake control device 212 is also electrically connected to the brake switch 224 and the brake lights 218 and 228.

When a driver triggers a braking action such as stepping on a brake pedal (not shown) or pressing a brake button (not shown), the brake switch 224 is turned on and a brake signal is sent to the trailer brake control device 212 through wire 203 for controlling the trailer brakes 214 and to the brake lights 218 and 228 through the wire 203 for turning on the brake lights 218 and 228. Once the brake signal is detected by the trailer brake control device 212, power will be immediately supplied to the trailer brakes 214 through the power wire 204 so as to engage the trailer brakes 214 and stop or slow down the trailer 210. Alternatively, if the trailer brake control device 212 senses that the sway of the trailer 210 exceeds a predetermined threshold, the trailer brake control device will also engage the trailer brakes 214 through the power wire 204.

Figure 3:
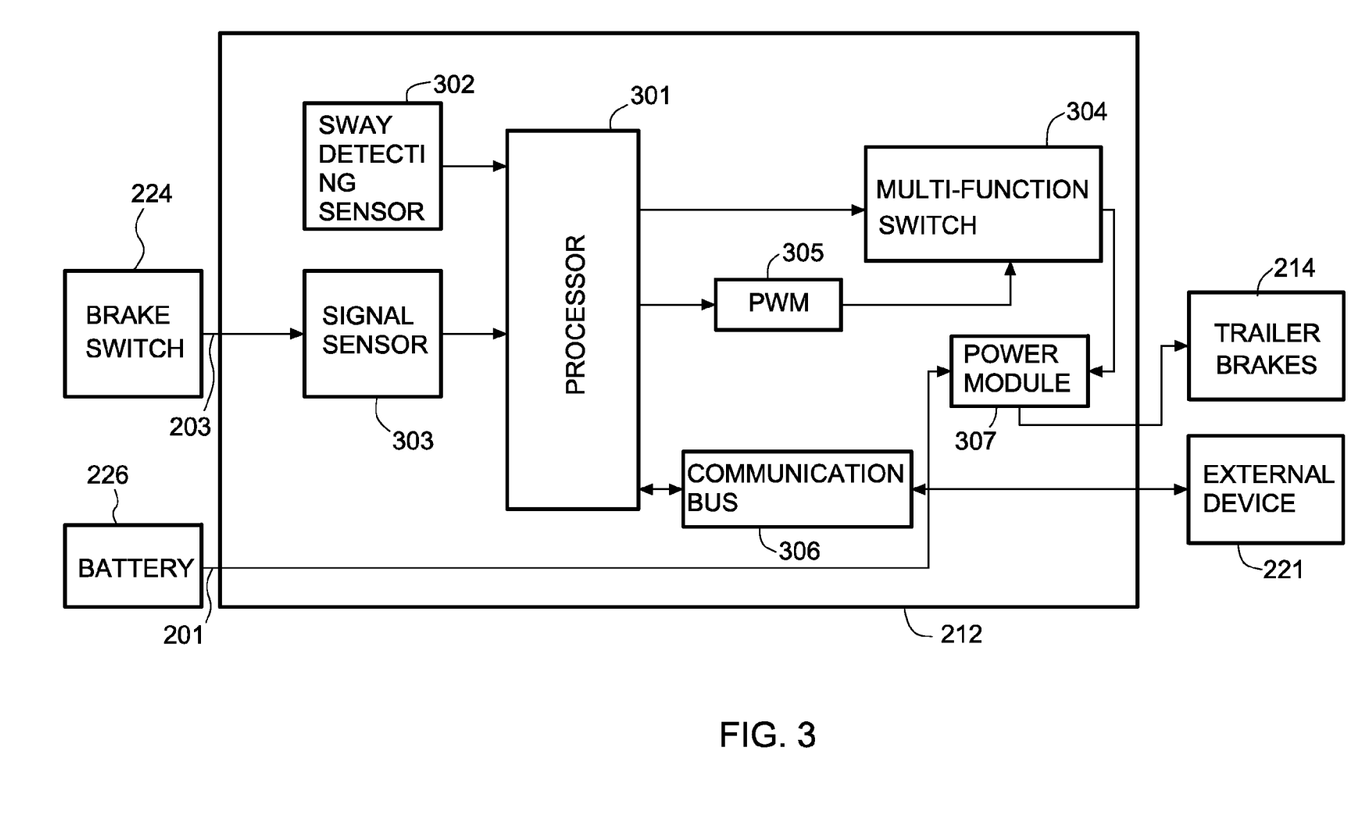
FIG. 3 is a detailed diagram illustrating the structure of the trailer brake control device in FIG. 2.

FIG. 3 is a detailed diagram illustrating the structure of the trailer brake control device 212. According to one preferred embodiment, the trailer brake control device 212 comprises a processor 301 (which may be a micro controller unit, for example), a sway detecting sensor 302, a signal sensor 303, a multi-function switch 304, a pulse-width modulator (PWM) 305, and a power module 307. The trailer brake control device 212 receives input from the power wire 201 and wire 203, and controls at least the trailer brakes 214.

As mentioned above, when the driver triggers a braking action, the brake switch 224 is turned on and sends a brake signal to the trailer brake control device 212. The brake signal can be sensed by the signal sensor 303. The sensed signal will then be sent to the processor 301. The processor 301 processes the sensed signal and sends a switching signal to the multi-function switch 304 so that the multi-function switch 304 is switched to receive and forward the output of the PWM 305. The PWM 305 varies the duty cycle of the outputted pulse train in proportion to the magnitude of the sensed brake signal. Thus, the duty cycle of the pulse train corresponds to the desired amount of braking force.

Alternatively, when the trailer 210 is swaying, the sway detecting unit 302 can sense the sway and responsively, send a sway signal to the processor 301 to inform the processor 301 of the sway. The processor 301 will then determine whether the sway exceeds a predetermined threshold. If it is determined that the sway exceeds the predetermined threshold, the processor 301 will, based on the level of the sway, turn on the multi-function switch 304 and instruct the PWM 305 to send a PWM signal through the multi-function switch 304 to the power module 307, so as to provide desired power (for example, with desired current and/or voltage) to engage to the trailer brakes 214 so as to stop or reduce the sway of the trailer 210. The above-mentioned sway detecting sensor 302 may include, but not limited to, at least one gyro sensor, accelerator, optical sensing device, or any other applicable sway detecting elements known in the art or the equivalents thereof According to one preferred embodiment of the present invention, the trailer brake control device 212 further comprises a communication bus 306. The processor 301 may send/receive a communication signal through the communication bus 306 to/from an external device 221 (which may be an LED module or display, for example) which can be preferably located in the towing vehicle 220. According to one embodiment of the present invention, the external device 221 may show any error information or any other data analyzed by the processor 301 to the driver in the towing vehicle 220. The detail implementation of the external device is described in the following paragraphs in company with FIG. 5.

According to one preferred embodiment of the present invention, the signal sensor 303 can be a current sensor, a voltage sensor, or the combination thereof The trailer brake control device 212 used in the trailer 210 according to the embodiment shown in FIGS. 2 and 3 of the present application is advantageous. Since the trailer brake control device 212 can perform the function of controlling the trailer brakes 214 in response to the brake signal generated by the driver through the brake switch 224, the conventional brake controller 122 and sway controller 112 can be replaced with the trailer brake control device 212. In other words, the towing vehicle towing the trailer 210 does not have to be equipped with a brake controller. Thus, the structure of the towing vehicle can be simplified and the cost of making the towing vehicle can be reduced. In the meantime, even if the trailer brake control device according to the present invention can perform both sway control and brake control, the cost of the trailer brake control device according to the present invention would not increase significantly compared with that of conventional sway controllers, since conventional sway controllers are already equipped with most of the elements of the trailer brake control device according to the present invention, such as the processor, PWM and power module.

Figure 4:
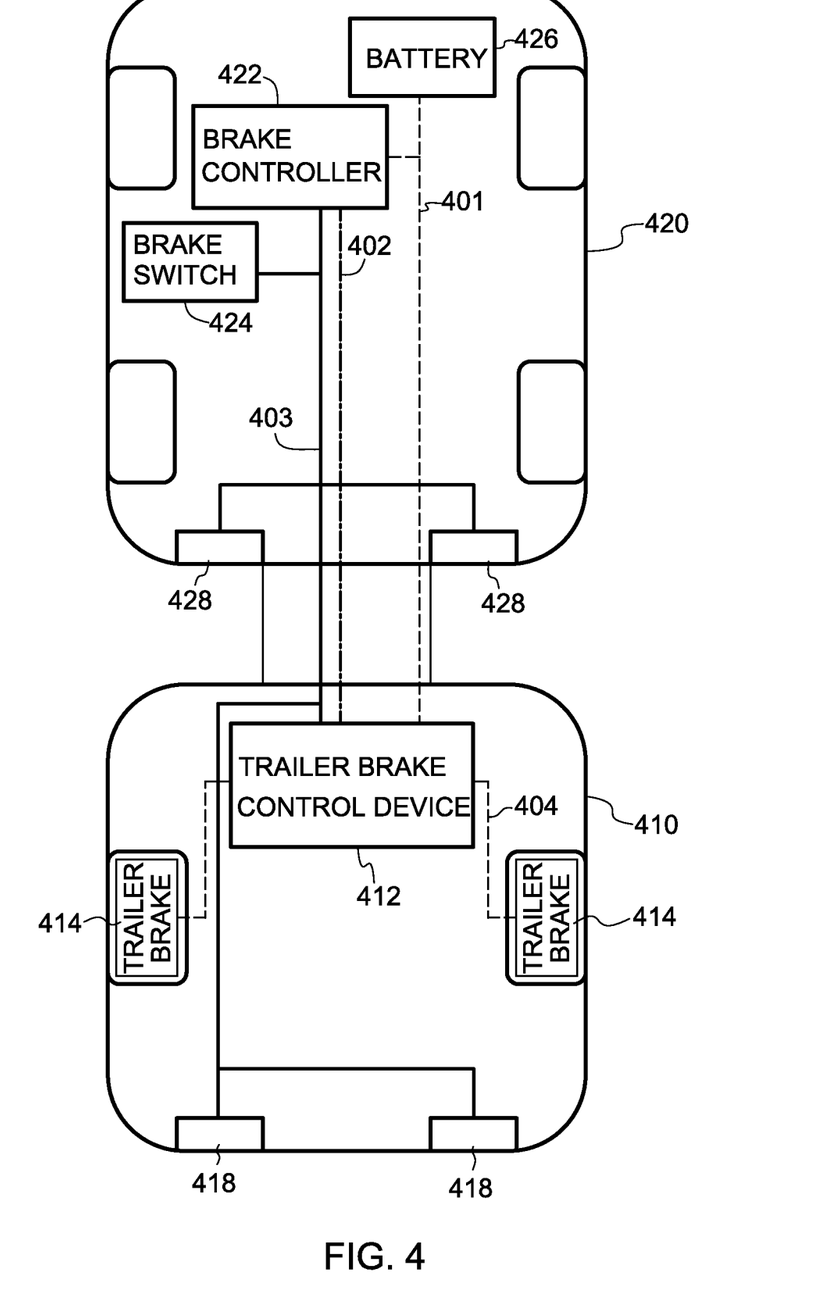
FIG. 4 is a simplified diagram illustrating a towing vehicle towing a trailer in accordance with one preferred embodiment of the present invention.

FIG. 4 is a simplified diagram illustrating a trailer towed by a towing vehicle in accordance with another preferred embodiment of the present invention. As shown in FIG. 4, the trailer 410 is towed by a towing vehicle 420. The trailer 410 comprises a trailer brake control device 412, trailer brakes 414, and brake lights 418, and the towing vehicle comprises a brake controller 422, a brake switch 424, a battery 426, and brake lights 428. The brake controller 422 and the trailer brake control device 412 are both electrically connected to the battery 426 through a power wire 401 so as to be powered. The brake switch 424 is electrically connected to the brake controller 422, the trailer brake control device 412, and the brake lights 418 and 428 through a wire 403. The brake controller 422 is electrically connected to the trailer brake control device 412 through another wire 402. The trailer brake control device 412 is electrically connected to the trailer brakes 414.

When a driver triggers a braking action, the brake switch 424 is turned on and sends a braking signal to the brake lights 418 and 428 to warn the drivers behind. At the same time, the braking signal is also sent to the brake controller 422 and the trailer brake control device 412. After the braking signal from the brake switch 424 is received by the brake controller 422, the brake controller 422 sends a control signal with corresponding current and/or voltage to the trailer brake control device 412 through wire 402. The trailer brake control device 412 is configured to detect the control signal through wire 402 and to determine whether the control signal is normal or abnormal by comparing the braking signal with the control signal. If the control signal is determined to be abnormal, then the trailer brake control device 412 determines that the brake controller 422 and/or wire 402 malfunction. In this case, in order to avoid any danger or risks, the trailer brake control device 412 will engage the brakes 414 in response to the brake signal from the brake switch 424.

Figure 5:
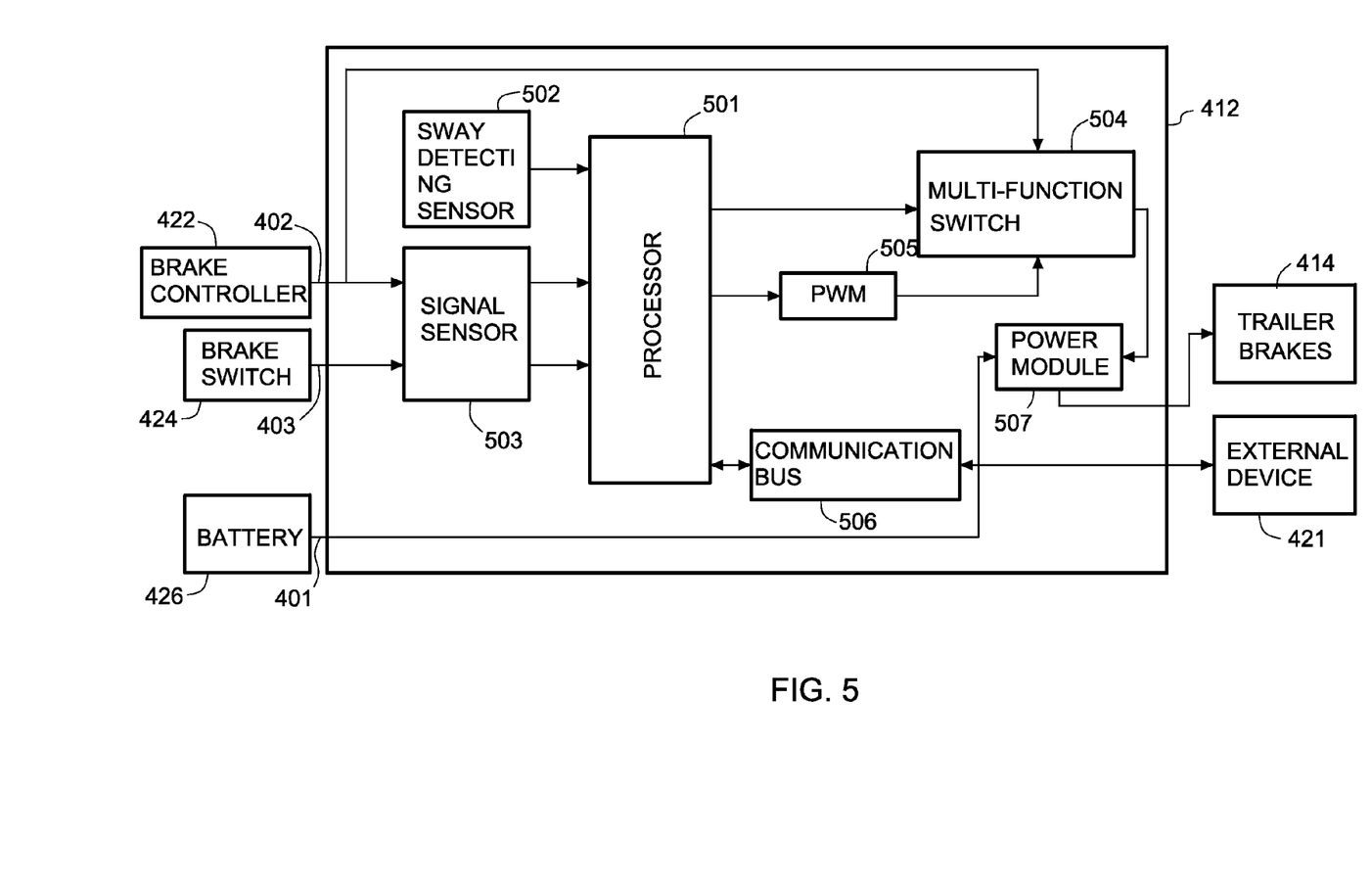
FIG. 5 is a detailed diagram illustrating the structure of the trailer brake control device in FIG. 4.

FIG. 5 is a detailed diagram illustrating the structure of the trailer brake control device 412. As shown in FIG. 5, the trailer brake control device 412 comprises a processor 501, a sway detecting sensor 502, a signal sensor 503, a multi-function switch 504, a PWM 505, and a power module 507. The trailer brake control device 412 has at least three inputs from the power wire 401, the brake controller 422 via wire 402, and the brake switch 424 via wire 403, and has at least one output to the trailer brakes 414.

As mentioned above, as the driver triggers a braking action, the brake switch 424 is turned on and sends a braking signal to the brake controller 422 and the trailer brake control device 412. Upon receiving the braking signal, the brake controller 422 responsively sends a control signal to the trailer brake control device 412 via wire 402. The control signal sent through wire 402 and the braking signal sent through wire 403 can both be sensed by the signal sensor 503. The sensed signals will then be sent to the processor 501 for processing. The processor compares the sensed control signal with the sensed braking signal, so as to determine if a normal condition or an abnormal condition occurs. The way to determine whether a normal condition or an abnormal condition occurs is discussed later in detail in conjunction with FIGS. 6a and 6b.

If, in the normal condition, in which the brake controller 422 and/or wire 402 are functioning properly, the processor 501 determines that the sensed control signal is normal, the processor 501 will send a switching signal to the multi-function switch 504 so that the multi-function switch 504 is switched to be input directly from wire 402 and to receive the control signal from the brake controller 422 and forward the control signal to the power module 507. The power module 507 then provides power to engage the trailer brakes 414 so as to slow down or stop the trailer 410.

On the other hand, if, in an abnormal condition in which that the brake controller 422 and/or wire 402 malfunction, the processor 501 determines that the sensed control signal is abnormal, the processor 501 will then send a switching signal to the multi-function switch 504 through the control terminal of the multi-function switch 504 so that the multi-function switch 504 is switched to be input from the PWM 505. In addition, as the processor 501 determines that the sensed control signal is abnormal, the processor 501 will also, in response to the sensed brake signal, send a processing signal to the PWM 505 so that the PWM outputs a PWM signal to the power module 507 through the multi-function switch 504 so as to instruct the power module 507 to provide desired power (for example, with desired current and/or voltage) to engage the trailer brakes 414 in order to slow down or stop the trailer 410.

In another case, when the trailer 410 sways over an acceptable range or the sway exceeds a predetermined threshold, even if the driver does not trigger a braking action, the sway detecting sensor 502 will send a sway signal to the processor 501 to inform of the processor 501 of the sway. The processor 501 will send a switching signal to the multi-function switch 504 so that the multi-function switch 504 is switched to receive input from the PWM 505. The processor 501 will process the sway signal and determine the level of the sway. After the level of the sway is determined, the processor 501 will, based on the level of the sway, instruct the PWM 505 to send a PWM signal through the multi-function switch 504 to the power module 507, so as to provide desired power (for example, with desired current and/or voltage) to engage the trailer brakes 414 in order to stop or reduce the sway of the trailer 410. The above-mentioned sway detecting sensor 502 may include at least one gyro sensor or other applicable sway detecting elements.

According to one preferred embodiment of the present invention, the trailer brake control device 412 further comprises a communication bus 506. The processor 501 may send/receive a communication signal through the communication bus 506 to/from an external device 421, which can be preferably located in the towing vehicle 420. According to one embodiment of the present invention, the external device can be an LED module. According to yet another embodiment of the present invention, the external device 421 can be a display, and the display can be a liquid crystal display (LCD), a touch-panel display, or any other types of displays known in the art. The above-mentioned LED-module or display of the external device 421 may show any necessary information such as abnormal or error information or other data analyzed by the processor 501 to the driver in the towing vehicle 420 so as to alert or inform the driver. According to yet another embodiment of the present invention, the external device can be a human-machine interface (HMI) device, e.g., a touch panel display. In such case, the HMI device provides the driver with an I/O interface allowing the driver to perform necessary control on the trailer brake control device 412 through the communication bus 506. According to yet another embodiment of the present invention, the HMI device can be used by the driver to control the trailer brakes 414, based on the information provided by the LED module(s) or display(s) and based on the driver's decision, via a controlling path at least passing through the communication bus 506, the processor 501, the multi-function switch 504, and the power module 507. The details of the mechanism of controlling the trailer brakes 414 through the processor 501 have been discussed above and thus are omitted here for brevity. One should know that, although the HMI device has been described above, the HMI device of the present invention is not limited to the form or structure as disclosed above, and can be any equivalents which can be applied appropriately to the present invention.

According to one embodiment of the present invention, the signal sensor 503 can be a current sensor and/or a voltage sensor. According to yet another embodiment of the present invention, the processor 501 determines whether the brake controller 422 and/or wire 402 malfunction by comparing the currents from wire 402 and wire 403 sensed by the signal sensor 503 and/or by comparing the voltages from wire 402 and wire 403 sensed by the signal sensor 503.

Figure 6A:
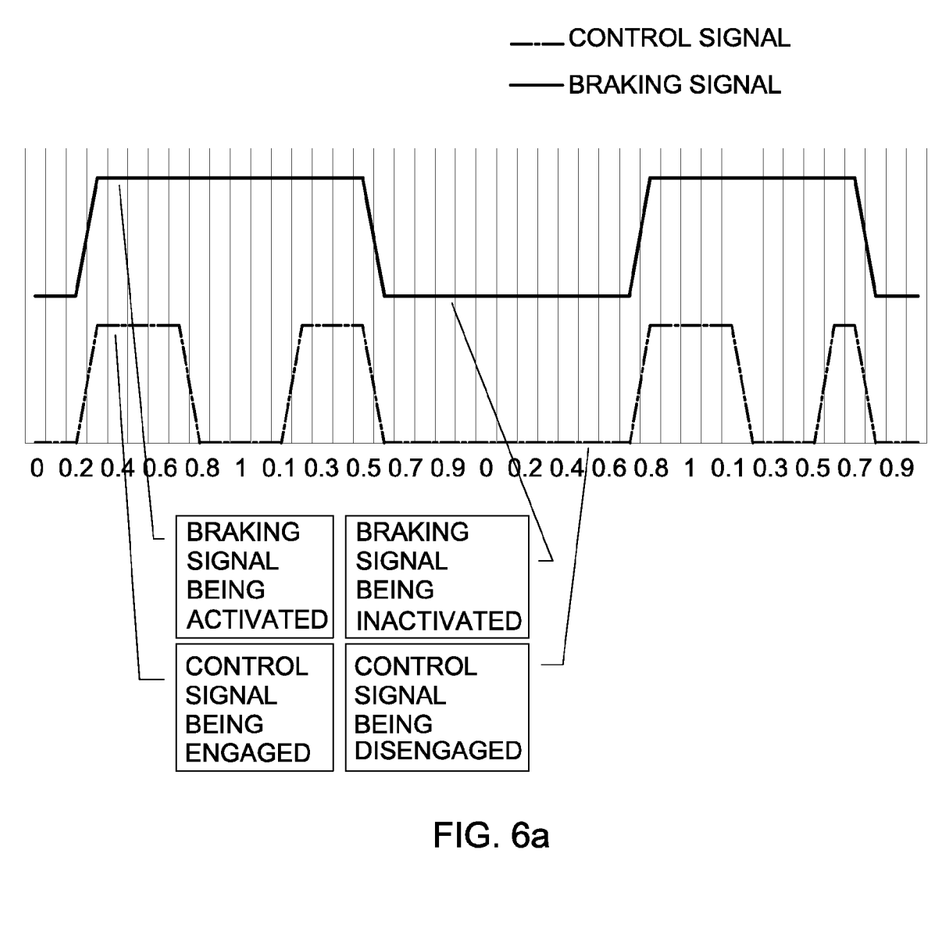
FIGS. 6a and 6b are diagrams illustrating how the normal and abnormal conditions are determined according to one preferred embodiment of the present invention.

FIGS. 6a and 6b are diagrams illustrating how the normal and abnormal conditions are determined. In FIG. 6a, the braking signal from the brake switch 424 and the control signal from the brake controller 422 in normal conditions are depicted. In normal conditions, the braking signal will be in the activated state during the time in which the driver triggers a braking action to brake the towing vehicle 420 and the trailer 410. During the time in which the driver triggers the braking action, the brake controller 422 should generate a control signal which is also in the activated state so as to output desired current and/or voltage through wire 402 for successfully engaging the trailer brakes 414. The engage duration depends on the proportional control method used to ensure that the deceleration goes smoothly.

Figure 6B:
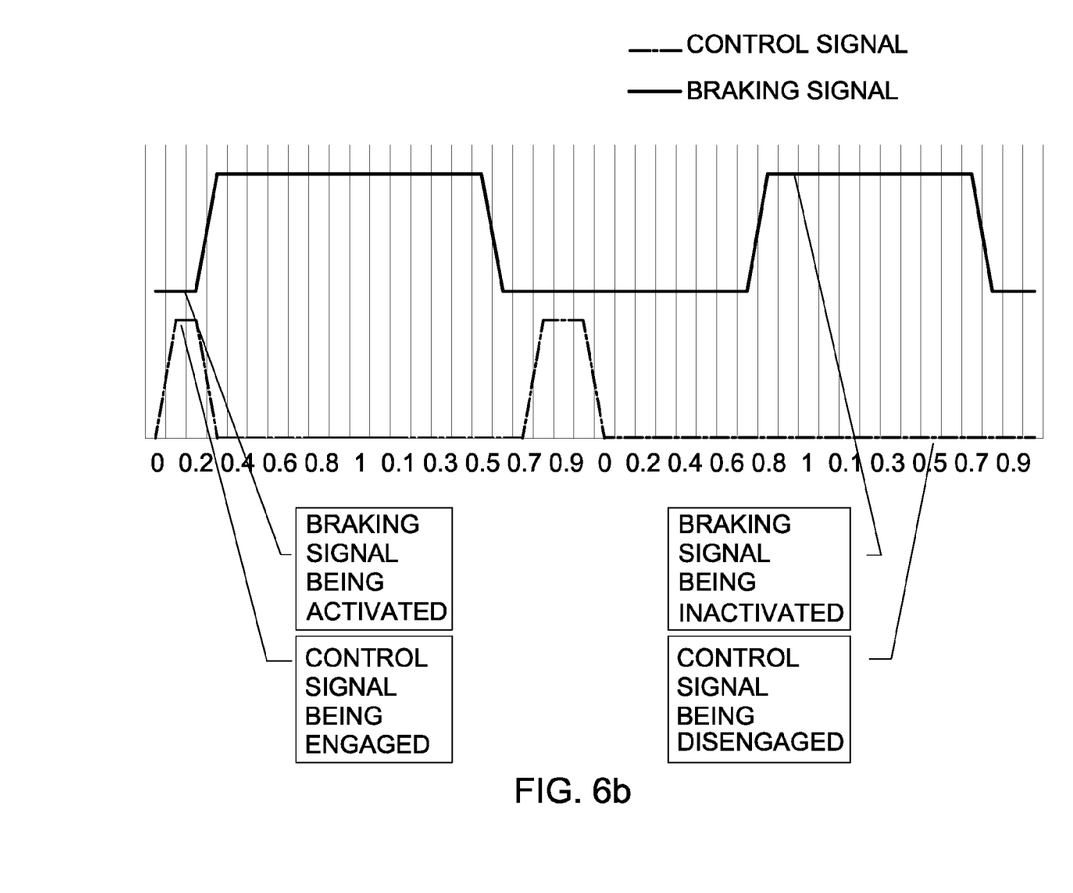

Referring to FIG. 6b, the braking signal from the brake switch 424 and the control signal from the brake controller 422 in abnormal conditions are depicted. In abnormal conditions, the braking signal will still be in the activated state during the time in which the driver triggers a braking action to brake the towing vehicle 420; however, if the brake controller 422 malfunctions, it cannot output a desired control signal which is in the activated state consistent with that of the braking signal, resulting in that the control signal is incompatible with and even contradicts the braking signal. In such case, the trailer brake control device 412 will process the sensed signals and take necessary correcting actions or operations such as those described above, and will inform the driver of the abnormal condition at the same time.

The trailer brake control device 412 used in the trailer 410 according to the embodiment shown in FIGS. 3 and 4 of the present application is advantageous. The trailer brake control device 412 can sense the inputs from both the brake switch 424 and the brake controller 422 and to diagnose whether the brake controller 422 or wire 402 malfunctions, and further acts as a backup system for controlling the brake when necessary. In addition, the trailer brake control device 412 can inform the driver of the occurrence of any malfunction or errors. Thus, the driver can immediately perform necessary checks to avoid any danger or risks.

While certain embodiments have been described above, these embodiments have been presented by way of example only. Accordingly, the device and methods described herein should not be limited to the described embodiments. Rather, the device and methods described herein should only be limited in light of the claims that follow when taken in conjunction with the above description and accompanying drawings.

What is claimed is:

1. A trailer brake control device arranged in a trailer for controlling a brake which provides force on at least one wheel of the trailer, the trailer brake control device comprising:
   a sway detecting sensor arranged in the trailer for detecting the sway of the trailer;
   a signal sensor for detecting a brake signal generated by a brake switch of a vehicle which tows the trailer and for detecting a control signal generated by a brake controller in the vehicle; and
   a processor, electrically connected to the sway detecting sensor, the signal sensor and the brake, for controlling the brake based on an output of the sway detecting sensor and an output of the signal sensor;
   wherein the processor compares the brake signal and the control signal and determines whether the brake controller functions or malfunctions based on whether the brake signal and the control signal are compatible or incompatible.

2. The trailer brake control device of claim 1, wherein the sway detecting sensor includes at least one gyro sensor, accelerator, or optical sensing device.

3. The trailer brake control device of claim 1, wherein the signal sensor comprises a current sensor and/or a voltage sensor.

4. The trailer brake control device of claim 1, further comprising a pulse width modulator electrically connected between the processor and the brake for modulating an output of the processor and passing the modulated signal toward the brake.

5. The trailer brake control device of claim 1, further comprising a multi-function switch having a first input electrically connected to the processor via a pulse width modulator, a second input electrically connected to the brake controller in the vehicle, an output electrically connected to the brake, and a control terminal electrically connected to the processor for selectively connecting the first input to the output by setting the multi-function switch to a first state and for selectively connecting the second input to the output by setting the multi-function switch to a second state.

6. The trailer brake control device of claim 5, wherein the processor sets the multi-function switch to the first state via the control terminal if the brake signal and the control signal are incompatible, and the processor sets the multi-function switch to the second state via the control terminal if the brake signal and the control signal are compatible.

7. The trailer brake control device of claim 6, wherein the processor is electrically connected to an external device for alerting a driver of the vehicle that the brake controller malfunctions if the brake signal and the control signal are incompatible.

8. The trailer brake control device of claim 7, wherein the external device comprises at least one of a status LED module, a display and a human-machine interface device.

9. The trailer brake control device of claim 1, wherein the brake signal and the control signal being compatible indicates that the activation states of the brake signal and the control signal are consistent, and wherein the brake signal and the control signal being incompatible indicates that the activation states of the brake signal and the control signal are inconsistent.

10. The trailer brake control device of claim 9, wherein the processor sets the multi-function switch to the first state via the control terminal if the output of the sway detecting sensor exceeds a predetermined threshold.

11. A trailer comprising the trailer brake control device of claim 1.

\* \* \* \* \*